Figure 5:
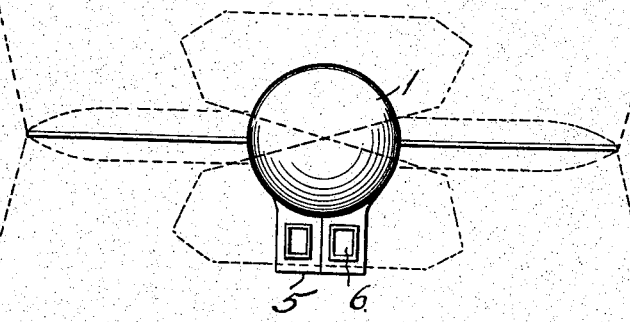

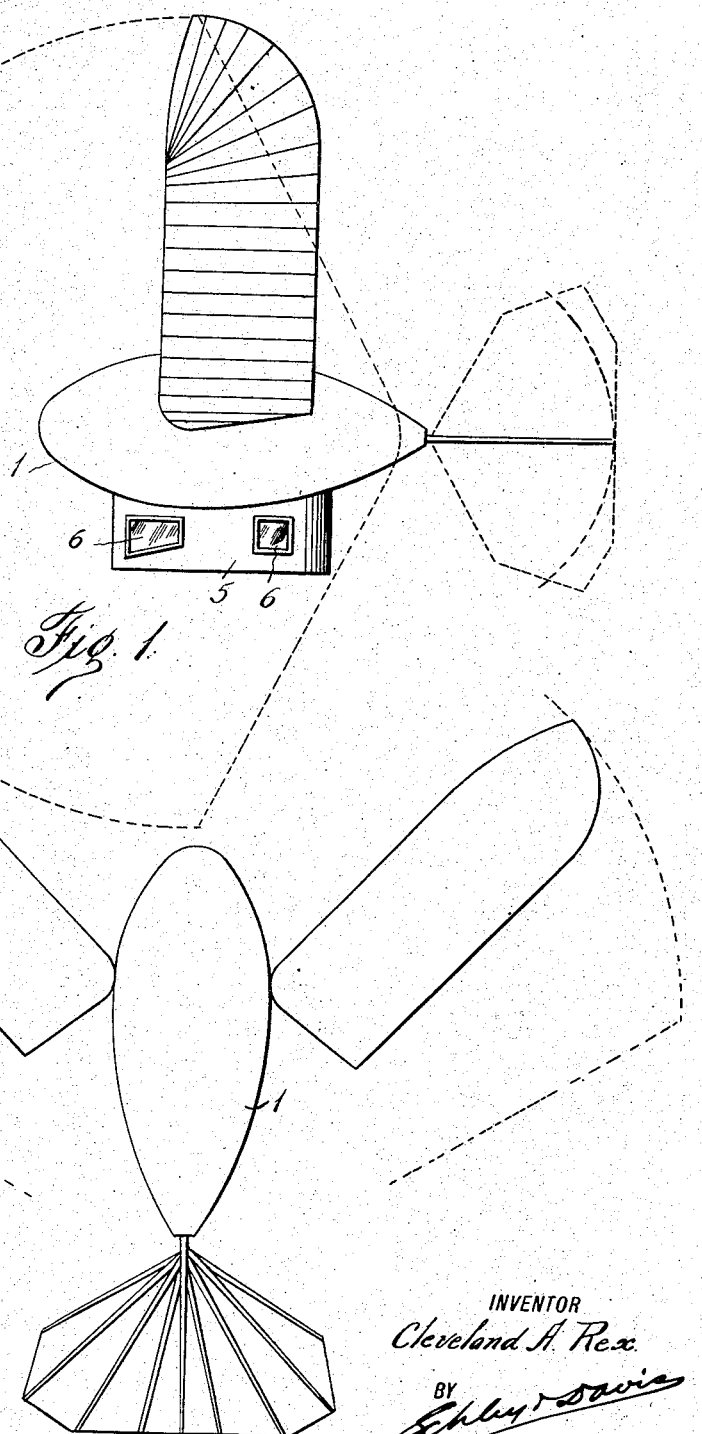

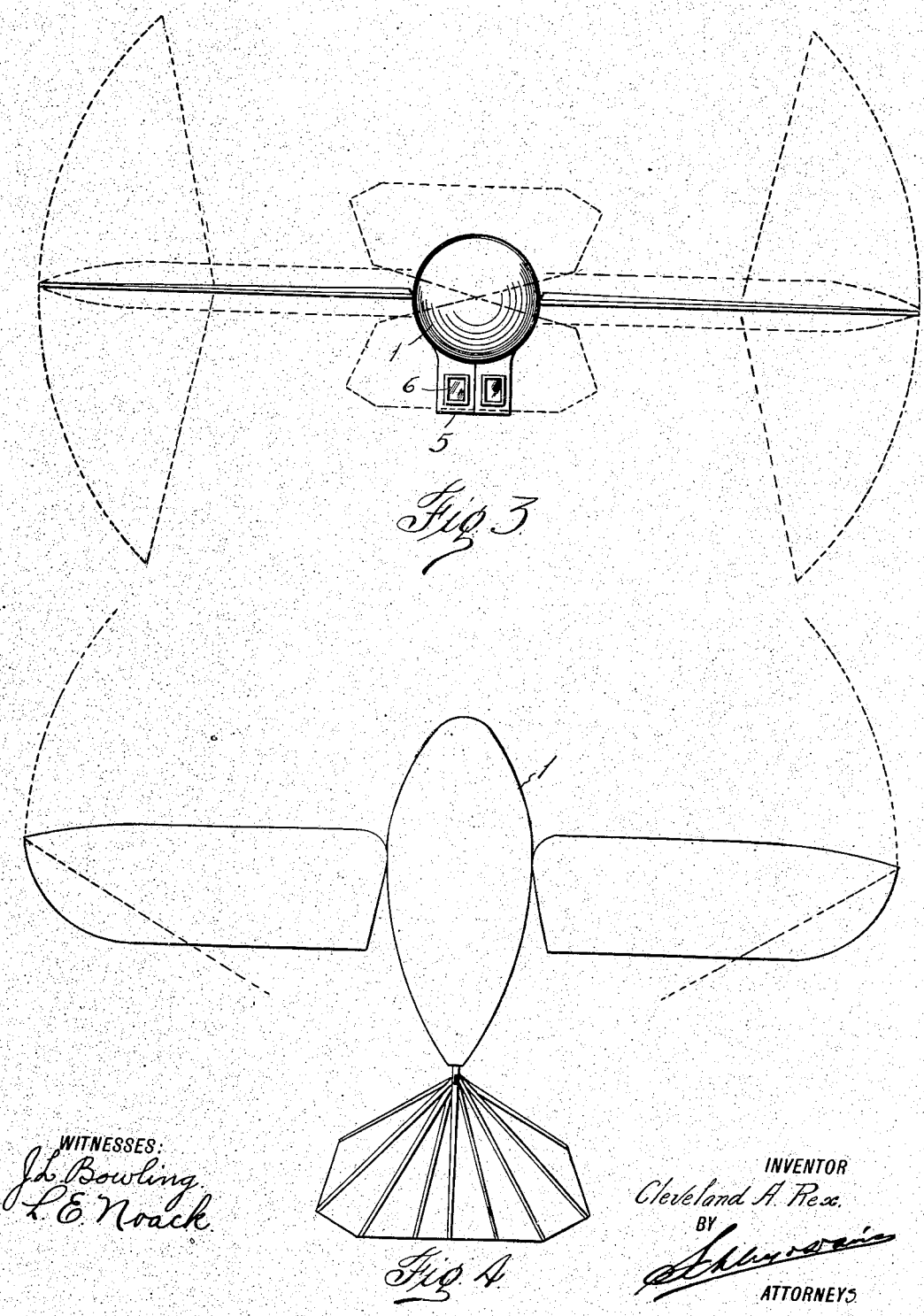

C. A. REX.
AERIAL VEHICLE.
APPLICATION FILED APR. 26, 1910.

1,013,219.

Patented Jan. 2, 1912.
15 SHEETS—SHEET 3.

WITNESSES:
J. L. Bowling
L. E. Noack

INVENTOR
Cleveland A. Rex
BY
Schluyor Davis
ATTORNEYS.

C. A. REX.
AERIAL VEHICLE.
APPLICATION FILED APR. 26, 1910.
1,013,219.
Patented Jan. 2, 1912.
15 SHEETS—SHEET 6.
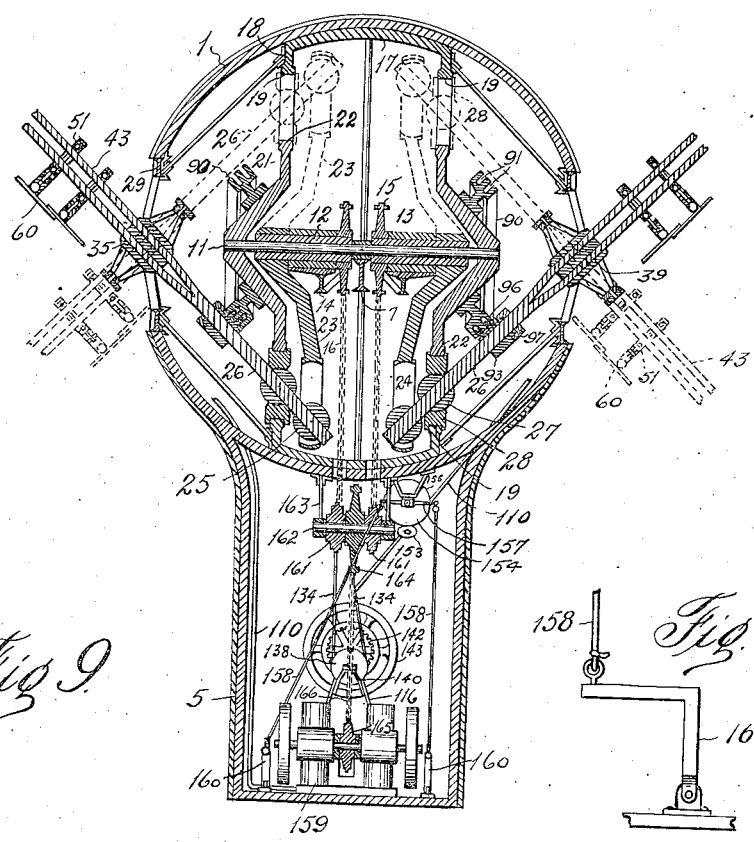
Fig. 9.
Fig. 34.
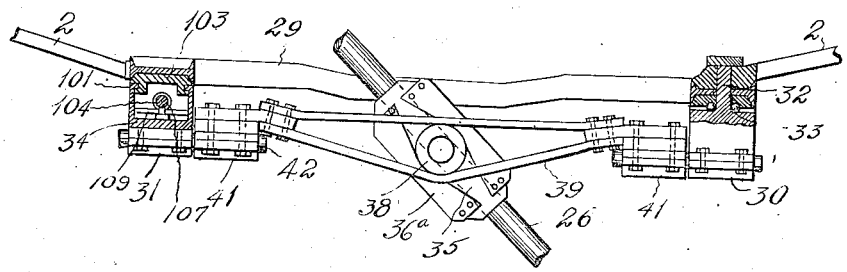
Fig. 10.
WITNESSES:
J. L. Bowling.
L. E. Noack.
INVENTOR
Cleveland A. Rex,
BY
ATTORNEYS.

C. A. REX.
AERIAL VEHICLE.
APPLICATION FILED APR. 26, 1910.

1,013,219.

Patented Jan. 2, 1912.
15 SHEETS—SHEET 7.

WITNESSES:
J. L. Bowling
L. E. Noack.

INVENTOR
Cleveland A. Rex

BY
ATTORNEYS.

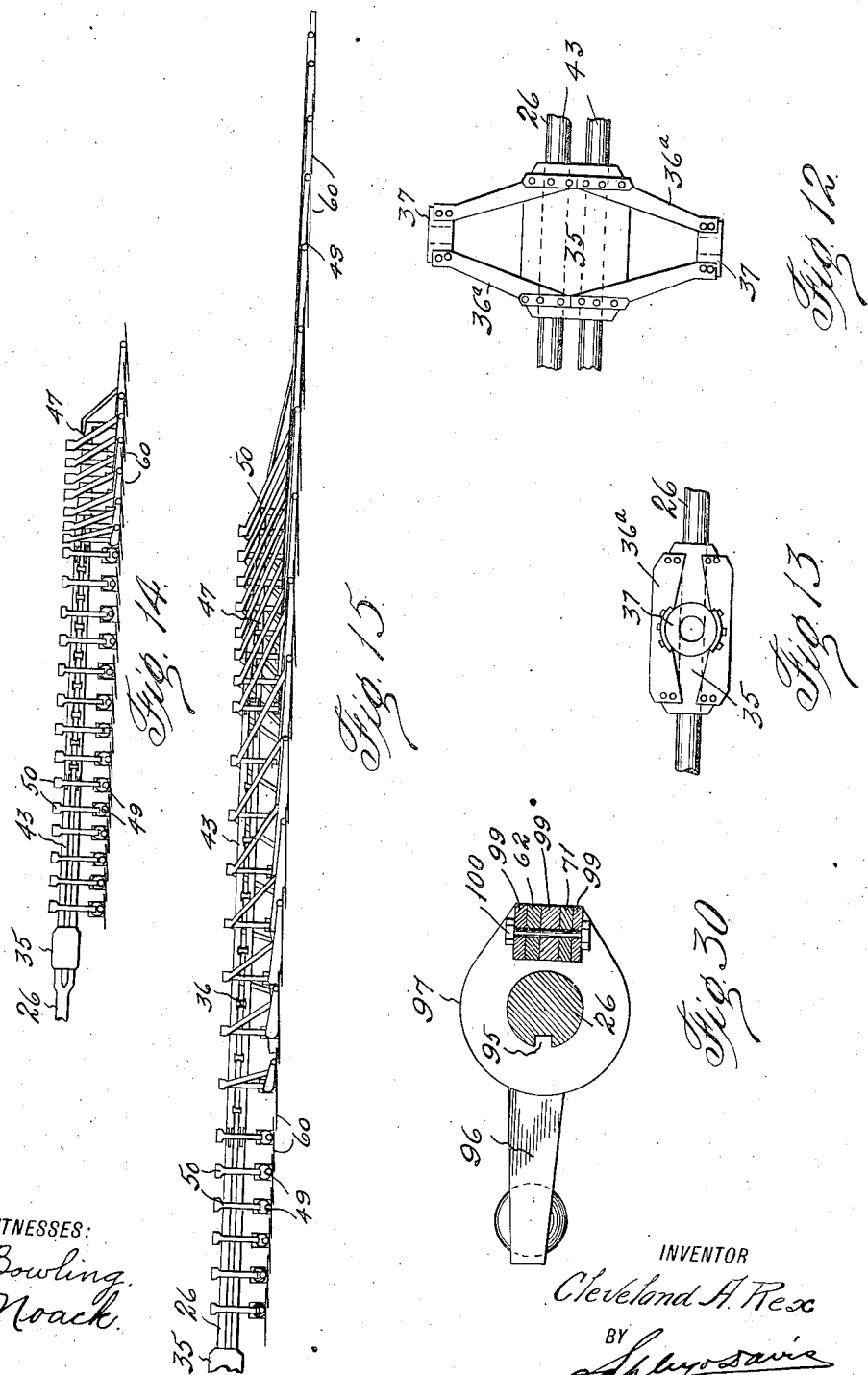

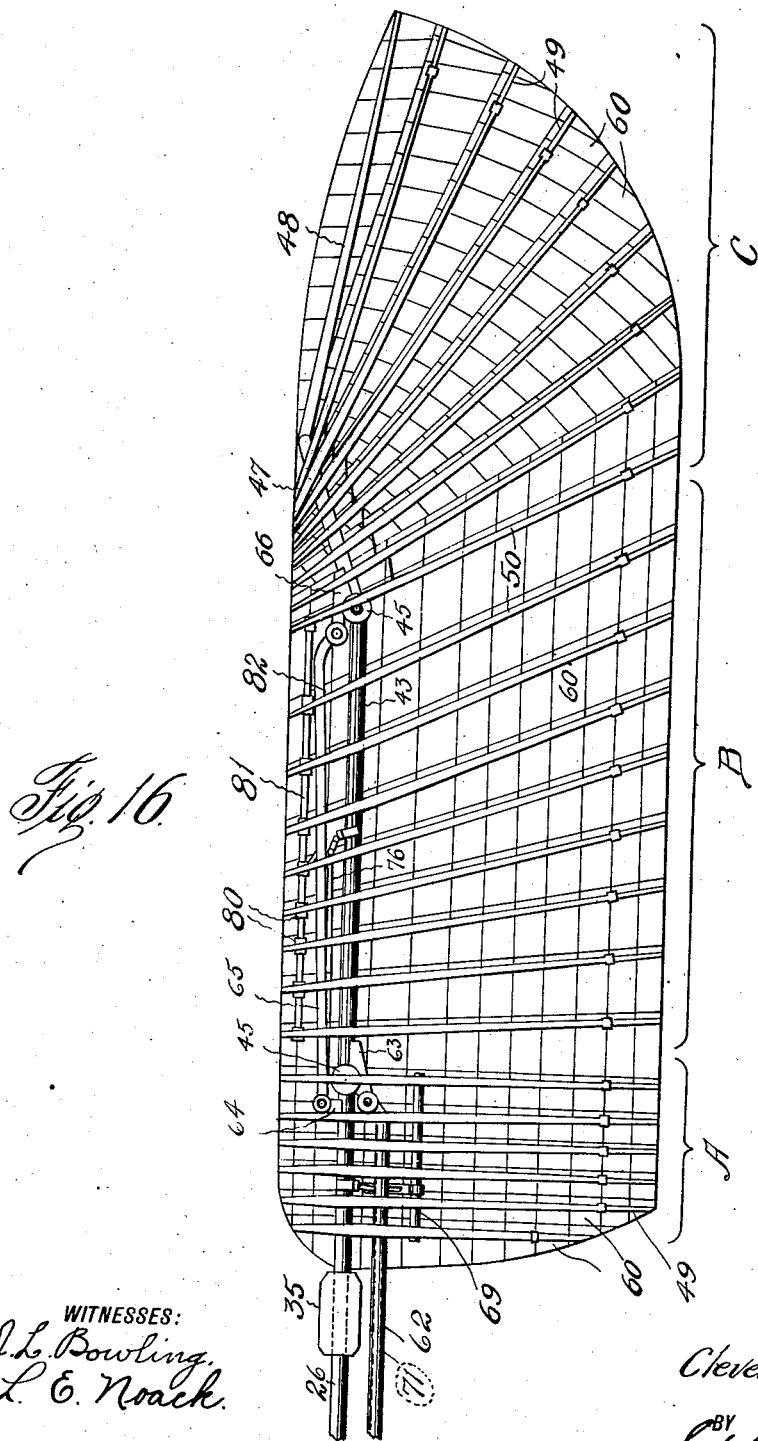

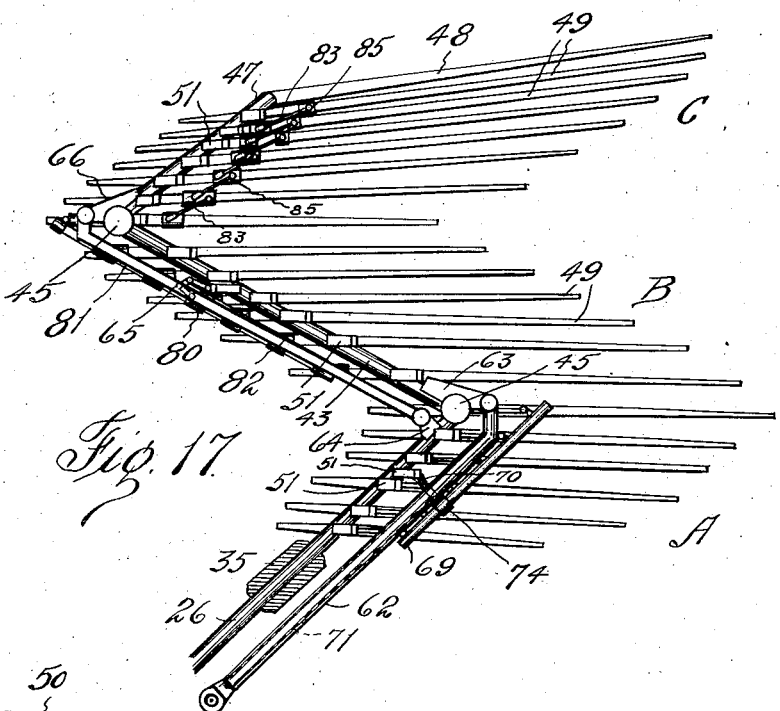

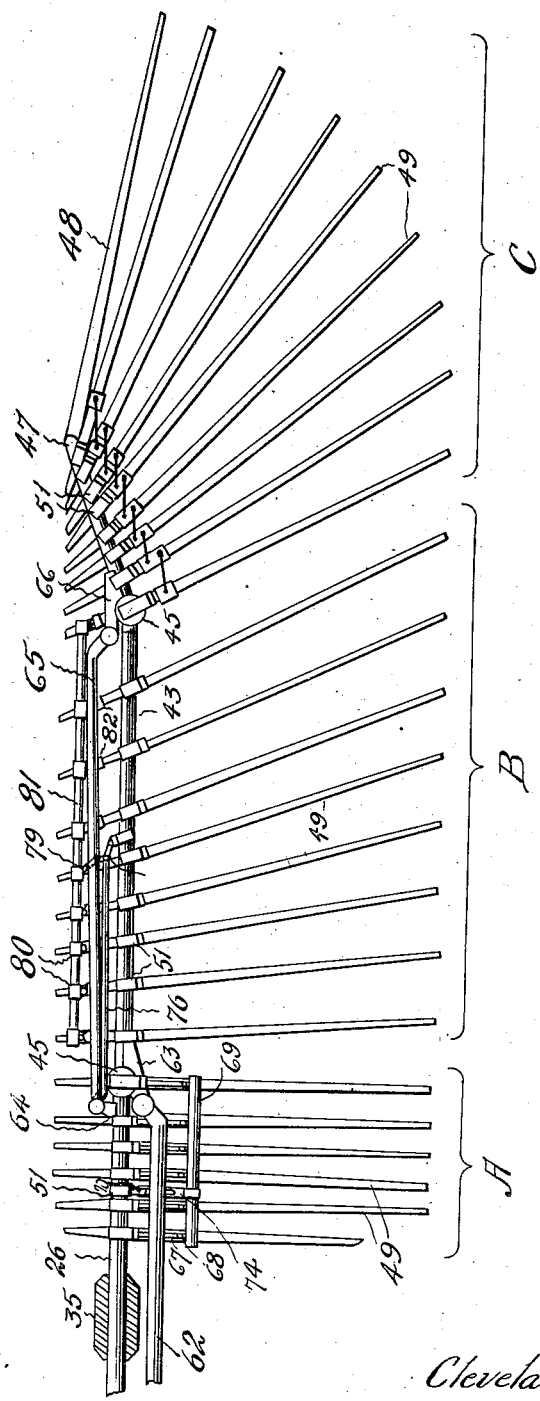

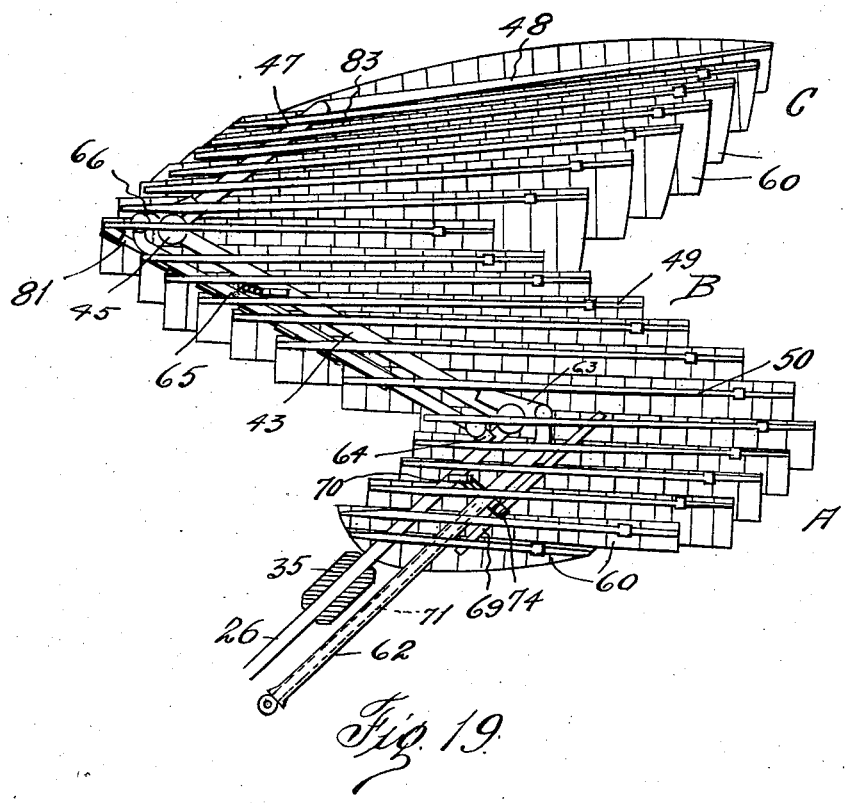

C. A. REX.
AERIAL VEHICLE.
APPLICATION FILED APR. 26, 1910.
1,013,219.
Patented Jan. 2, 1912.
15 SHEETS—SHEET 13.
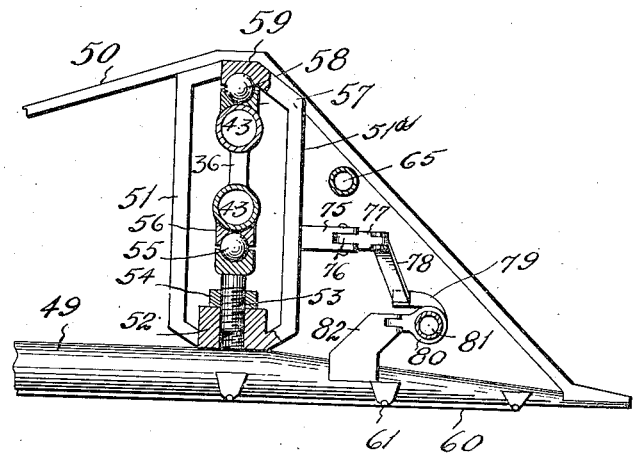
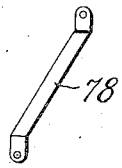
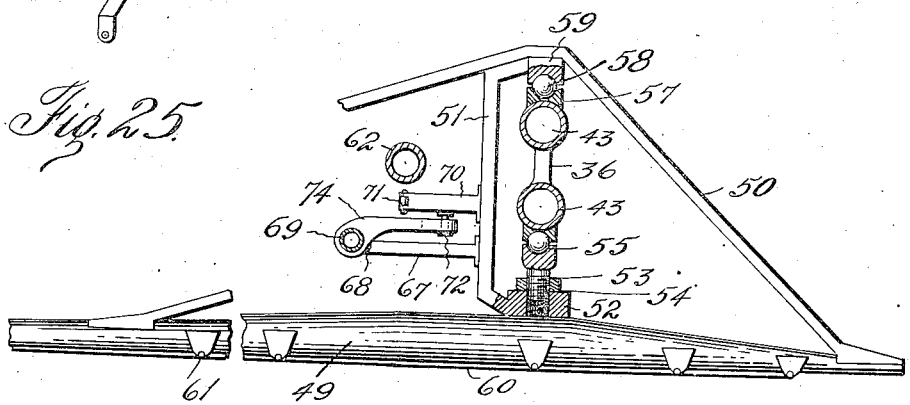
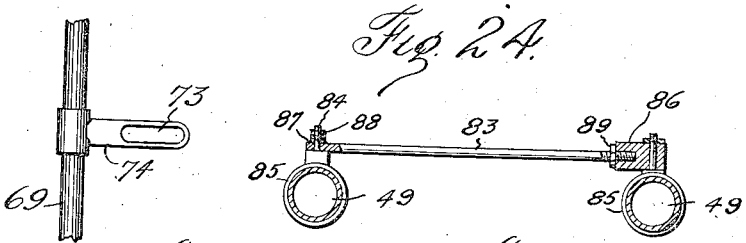
WITNESSES:
J. L. Bowling
L. E. Noack
INVENTOR
Cleveland A. Rex.
BY
ATTORNEYS

C. A. REX.
AERIAL VEHICLE.
APPLICATION FILED APR. 26, 1910.

1,013,219.

Patented Jan. 2, 1912.
15 SHEETS—SHEET 14.

WITNESSES:
J. L. Bowling.
L. E. Noack.

INVENTOR
Cleveland A. Rex.
BY
Schley & Davis
ATTORNEYS.

C. A. REX.
AERIAL VEHICLE.
APPLICATION FILED APR. 26, 1910.

1,013,219.

Patented Jan. 2, 1912.
15 SHEETS—SHEET 15.

WITNESSES:
J. L. Bowling
L. E. Noack

INVENTOR
Cleveland A. Rex
BY
ATTORNEYS

UNITED STATES PATENT OFFICE.

CLEVELAND A. REX, OF AMARILLO, TEXAS, ASSIGNOR TO THE REX AERIAL NAVIGATING AND CONSTRUCTION COMPANY OF NEW JERSEY, OF PHOENIX, ARIZONA TERRITORY, A CORPORATION OF ARIZONA TERRITORY.

AERIAL VEHICLE.

1,013,219.  Specification of Letters Patent.  Patented Jan. 2, 1912.

Application filed April 26, 1910. Serial No. 557,653.

*To all whom it may concern:*

Be it known that I, CLEVELAND A. REX, citizen of the United States, residing at Amarillo, in the county of Potter and State of Texas, have invented certain new and useful Improvements in Aerial Vehicles, of which the following is a specification.

This invention has relation to mechanism for imparting an upwardly and forwardly impelling force to vehicles.

The object of the invention is to provide a vehicle of the aerial type, but in which no fixed planes are employed, that is fixed planes like those of the aeroplane, and to carry out said invention by providing a body having folding wing planes movable in a predetermined course; together with a tail or rear plane acting as a rudder.

Further the object of the invention is to provide means for swinging the wings in a peculiar manner and extending and retracting the wings at certain periods of the movement thereof; together with means for adjusting the wings to meet varying air currents and various other novel features of construction and arrangement which will be hereinafter pointed out.

Figure 6:
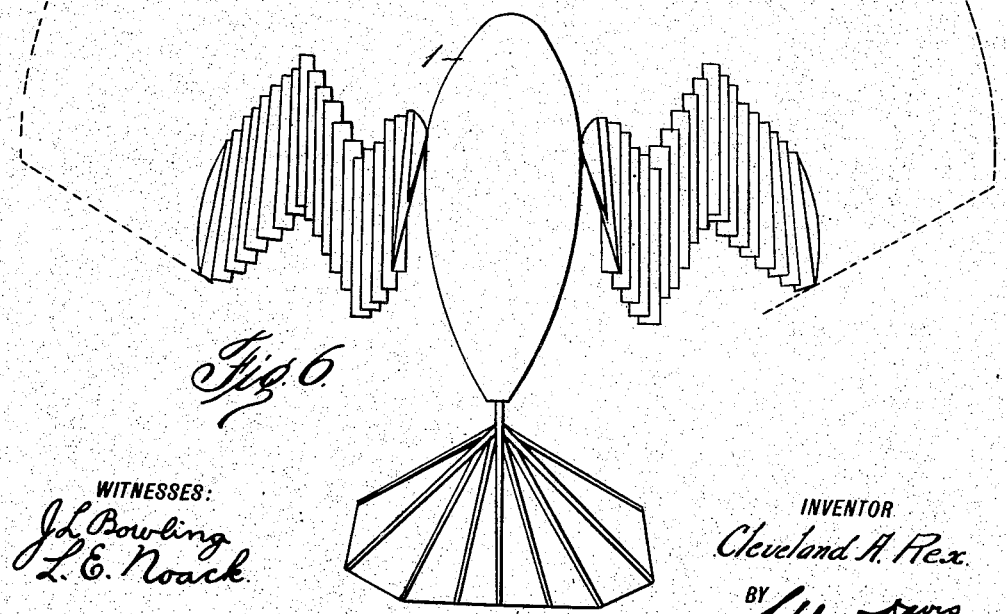
Figure 7:
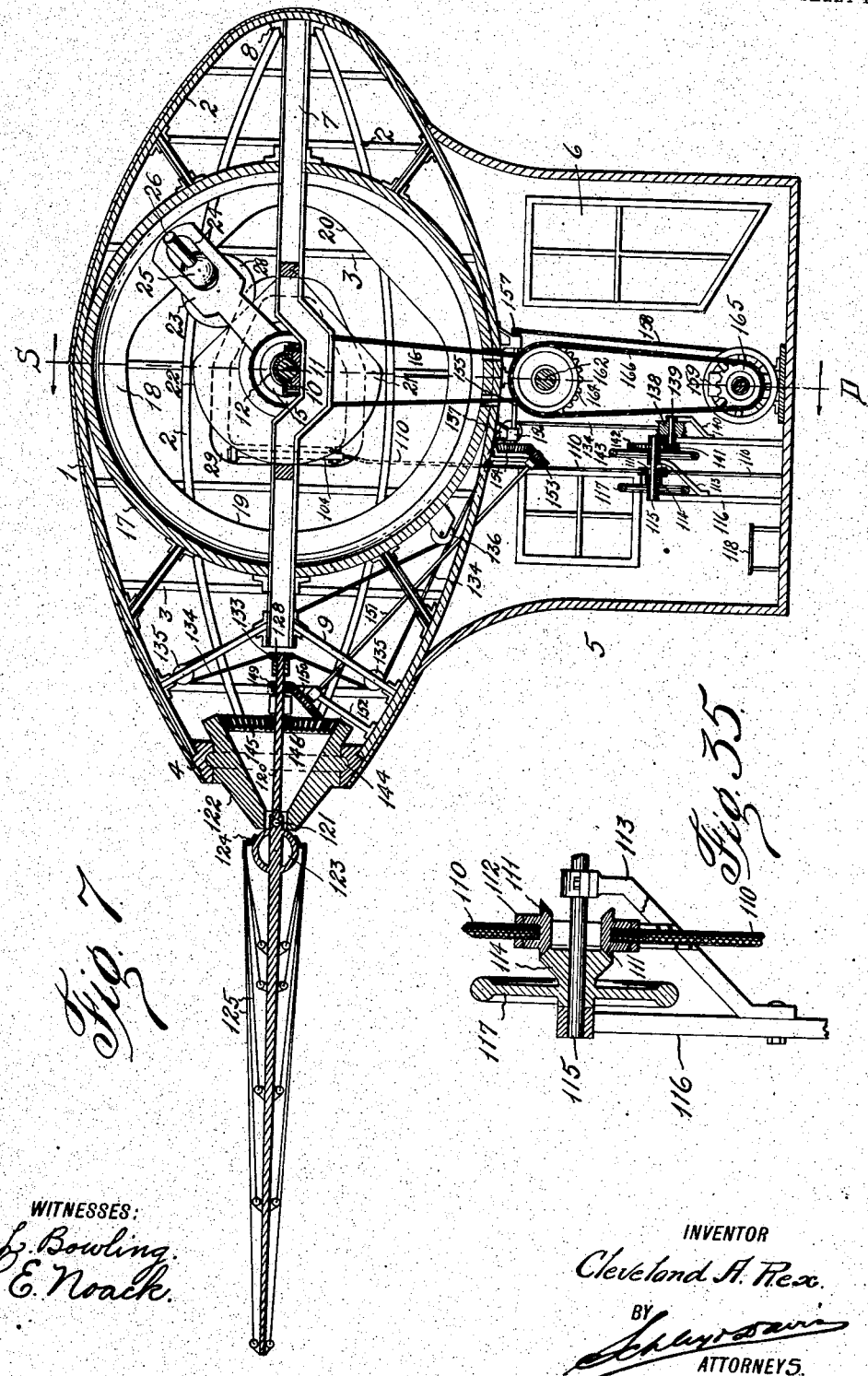
Figure 8:
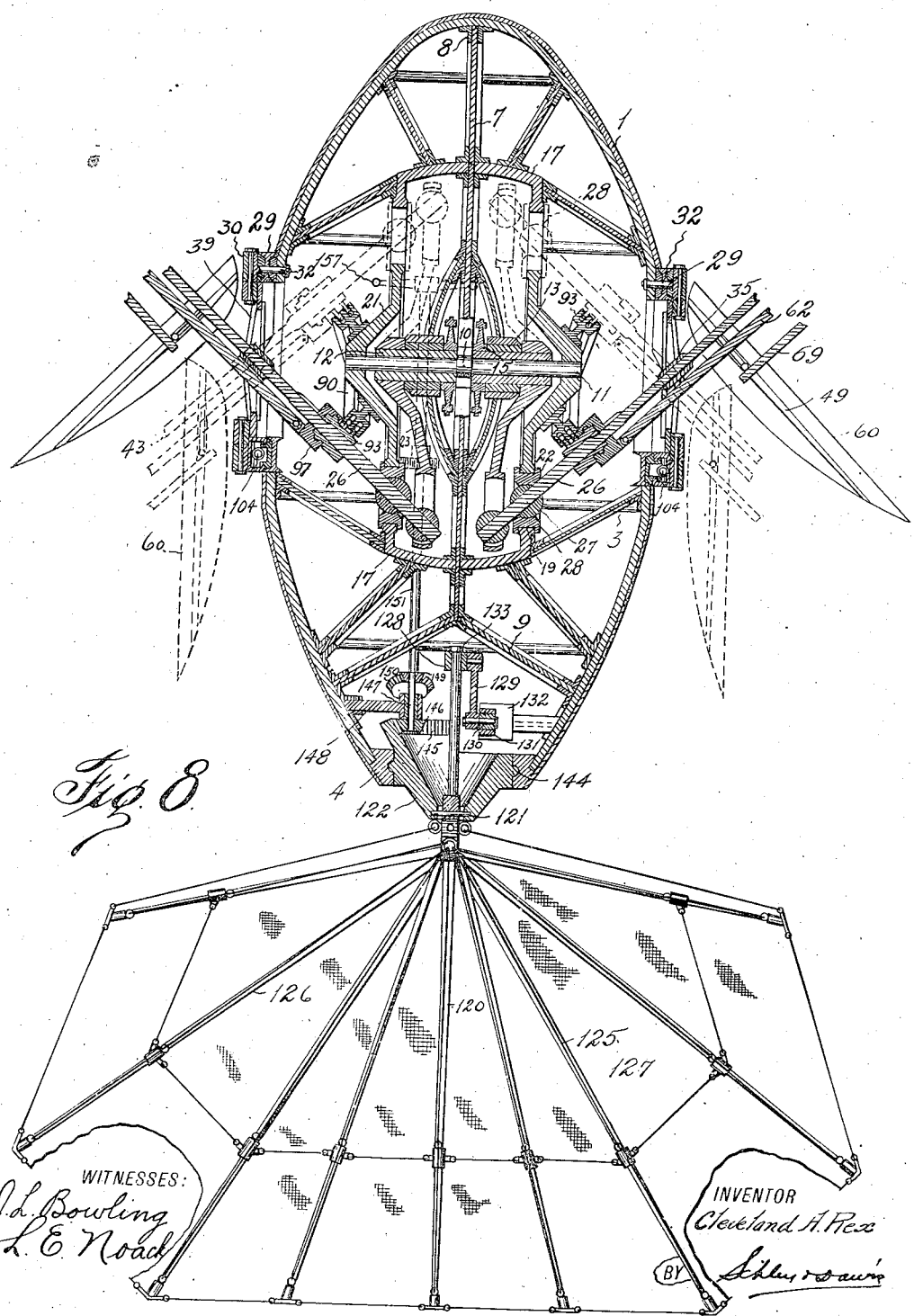
Figure 11:
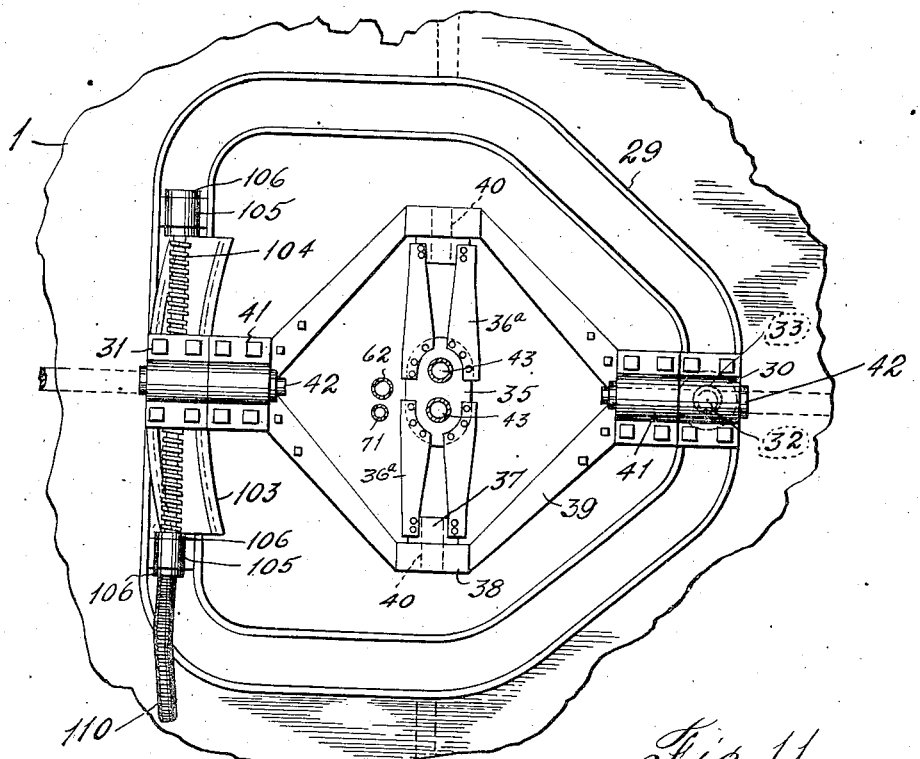
Figure 32:
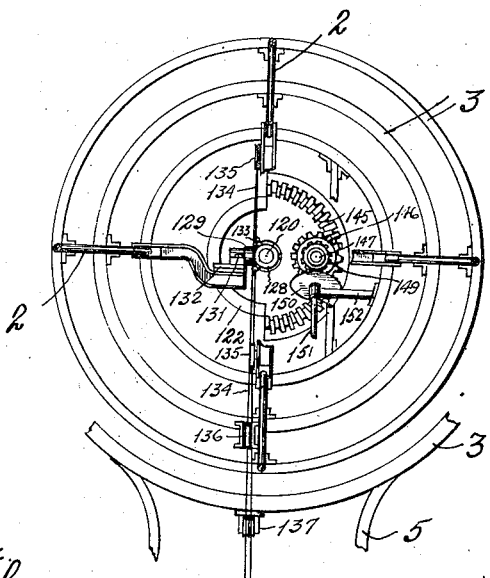
Figure 27:
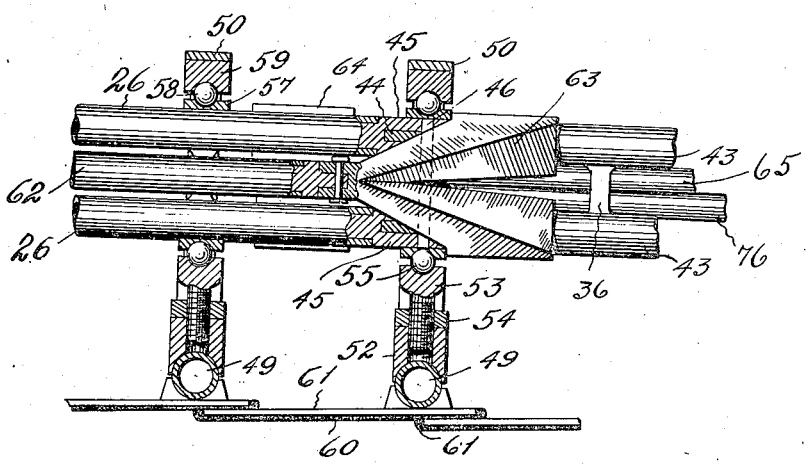
Figure 28:
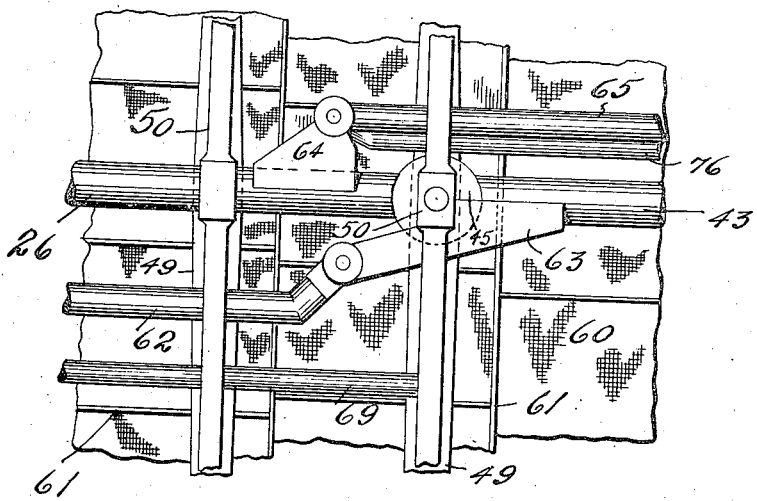
Figure 37:
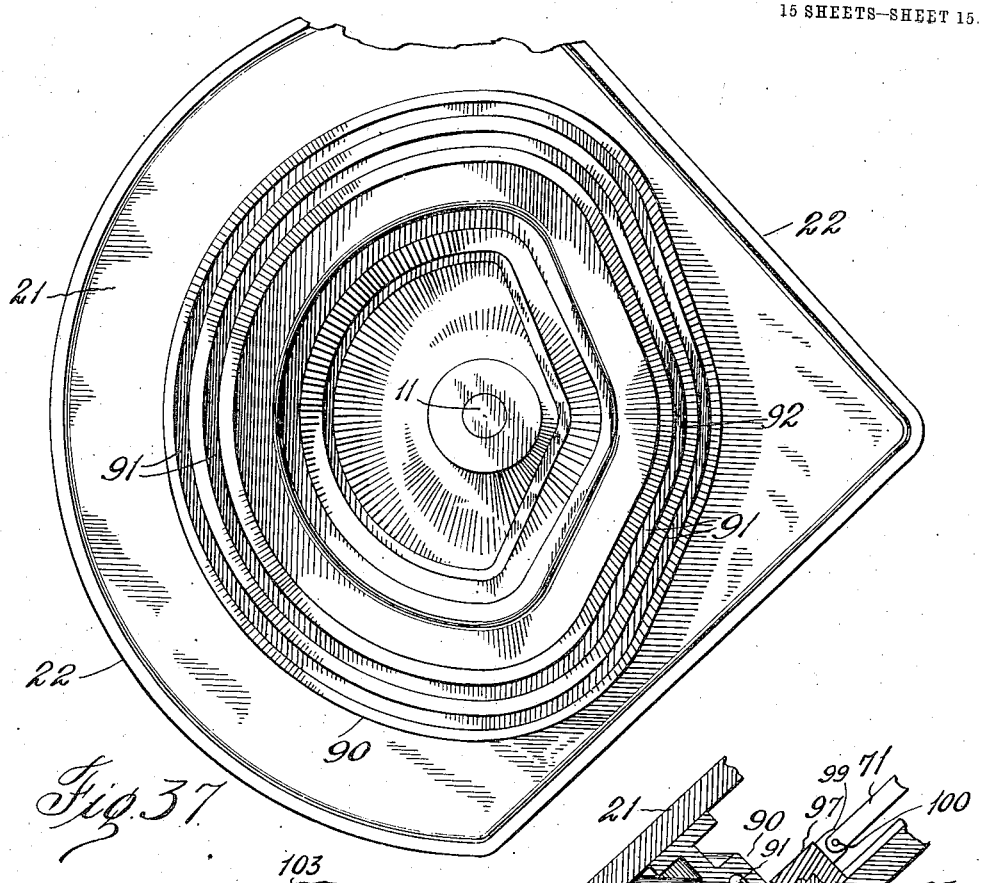
Figure 33:
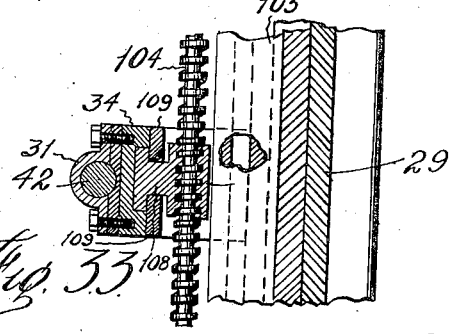
Figure 31:
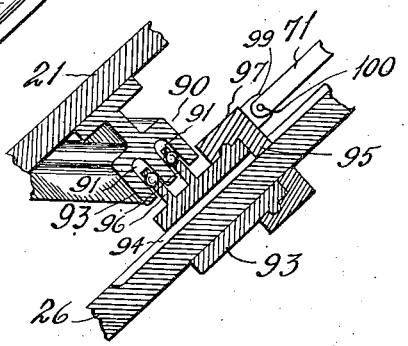
Figure 36:
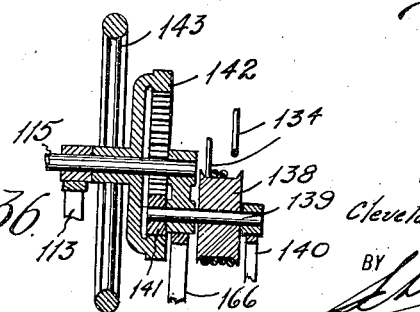

With the above and other objects in view the invention has relation to certain features of construction and operation, an example of which is described in the following specification and in the accompanying drawings, wherein:

Figure 1. is a side elevation, details omitted, showing the wings fully extended in extreme upward position and ready to begin down stroke, the entire stroke of the wings being indicated in dotted lines, while the tail is shown in full lines in its normal horizontal position, dotted lines indicating the "twisted" position of the tail and its vertical movement, Fig. 2. is a plan view with the wings fully extended and in their extreme forward position, dotted lines indicating the path of their stroke in plan, details omitted, Fig. 3. is a front elevation with the wings fully extended and in the same position as shown in Fig. 2, dotted lines indicating the vertical path of the wings and inclination from a horizontal plane up and down, while other dotted lines indicate the positions and path of movement of the tail, Fig. 4. is a plan view with the wings at their central position, Fig. 5. is the same as Fig. 3 except that the wings are folded or retracted and are at their extreme rearward position, Fig. 6. is a plan view with the parts in the position shown in Fig. 5, Fig. 7. is a longitudinal vertical sectional view, Fig. 8. is a horizontal cross-sectional view, portions of the wings being omitted and the remaining portions of the wings and operating means being shown in full lines to indicate their position when the wings are unfolded, while in dotted lines, their position when the wings are folded, is shown, Fig. 9. is a transverse vertical sectional view on the line S—D of Fig. 7, the wings having portions omitted and shown in two positions, as in Fig. 8, Fig. 10. is a horizontal section of one of the rocker mechanisms and adjacent parts, Fig. 11. is a detail in elevation of the parts shown in Fig. 10, Fig. 12. is a detail in elevation of the rocker, Fig. 13. is a plan of the same, Fig. 14. is a side elevation of one of the wings folded, Fig. 15. is a similar view with the wing unfolded, Fig. 16. is a plan of one of the wings fully unfolded, Fig. 17. is a plan view of one of the wings folded and the planes and bands omitted, Fig. 18. is a similar view of the wing unfolded, Fig. 19. is a plan view with the wing folded, Fig. 20. is a detail in section of one of the plane supporting yokes and component parts, Fig. 21. is a similar view at right angles, Fig. 22. is a detailed elevation of one of the planes of section A, its supports and adjacent parts, Fig. 23. is a similar view of one of the planes of wing section B, Fig. 24. is another detail of one of the planes of wing section A, Fig. 25. is a detail of the link 78, Fig. 26. is a detail in plan of the lever 74, Fig. 27. is a detail in vertical section of the joint between two of the wing sections, Fig. 28. is a plan view of the same, Fig. 29. is a detail in section of one of the rod connections between the spars of section C of the wing, Fig. 30. is a detail of the ring 97 and connecting parts, Fig. 31. is a detail in section of the ring and collar mechanism for operating the wing folding and unfolding means, Fig. 32. is a transverse vertical sectional view looking rearward and with the housing and braces omitted, Fig. 33. is a detail in section on the line x—x of Fig. 11, Fig. 34. is a detail in elevation of one of the foot levers, Fig. 35. is a detail of the flexible shaft operating mechanism, Fig. 36. is a detail of the steering wheel, and Fig. 37. is an elevation of one of the runways.

In order to clearly describe this invention it is deemed advisable to take up the various mechanisms in groups and to explain the operation and construction of each group separately.

In the drawings the numeral 1 designates an elliptical body substantially pointed at each end. This body comprises a frame composed of properly spaced longitudinal bands 2 and circumferential ribs 3 intersecting with and suitably fastened to the bands. At the forward end the bands converge to a common point of intersection coincident with the central longitudinal axis of the body and at which point they are suitably fastened together. At the rear end of the body the bands terminate in a bearing ring 4 as is shown in Figs. 7 and 8. This frame is suitably covered to present a substantially smooth exterior surface, but in some of the figures the covering is omitted.

From the under central portion of the body a car or cage 5 is suitably hung. This car may be of any suitable construction and is secured to the body by suitable means. At its forward end as shown in Figs. 3 and 5 the sides of the car are brought together and meet on a vertical line of intersection at the center, which construction offers little resistance to the forward movement of the car. The car is provided with suitable windows 6 by which the operator may enter or leave the car and through which he may observe his course.

The essential groups of mechanism constituting the vehicle are the body and car, the movable wings, mechanisms for operating, adjusting and manipulating the wings, the tail, and the means for operating and manipulating the tail.

In Figs. 1 to 6 inclusive the various positions assumed by the wings and tail are shown in full and dotted lines. In these figures details have been omitted for the sake of clearness, the figures being shown more to illustrate the positions of the wings and tail than to show construction.

Extending longitudinally of the center of the body is a main beam 7 as shown in Figs. 7, 8 and 9. At its forward end the beam is suitably secured in a bracket 8 fastened to the frame, while its rear end terminates some distance from the rear end of the body and is rigidly supported by radial braces 9 secured at their outer ends to the frame of the body. At the center of the body the beam 7 is depressed as best shown in Fig. 7 to form a seat for a clamp box 10 securely fastened on the beam and rigidly holding against rotation, a horizontal transverse main shaft 11. On each side of the box 10, sleeves 12 are mounted to revolve on the main shaft 11. These sleeves terminate a short distance from the ends of the shaft and rotate in bearing boxes 13 fixed on curved suspension beams 14 underhung on each side of the main beam and secured thereto at their ends. On each side of the clamp box 10 sprocket wheels 15 are fixed on the ends of the sleeves and bear against the inner ends of the bearing boxes. Motion is imparted to the sprockets 15 by sprocket chains 16 running over sprocket wheels 161 fixed on a transverse shaft 162 hung in brackets 163 suspended in the car 5 from the body 1 as shown best in Fig. 9. Between the sprockets 161, a large driven sprocket 164 is secured on the shaft 162 and is driven by a sprocket chain 166 engaging about a drive sprocket 165 fixed on the shaft of an engine 159 secured transversely of the car on the floor thereof.

In concentric relation to the shaft 11 a circular housing 17 is secured in the frame of the body as is best shown in Figs. 7, 8 and 9. This housing is formed on each side with an inwardly extending wall 18 in radial relation to the main shaft. The inner edge of each wall 18 is provided with a track 19, the rear half of which is in the form of an arc of a circle concentric to the shaft 11; while the forward half 20 of the track is shaped in the form of an angle diverging from the longitudinal center of the body, the sides of which merge at their ends into the circular portion of the track, a continuous cam track 19 thus being provided on each wall.

On each end of the main shaft 11, a cam plate 21 is fixed against rotation. These plates are projected inwardly so that each has on its edge a cam track 22 conforming to, and in vertical alinement with the track 19. It is to be understood that the tracks 19 surround the tracks 22 with sufficient space between each track 22 and the adjacent track 19 for the travel of a wing operating shoe hereinafter described.

Beyond each box 13, an inwardly bent arm 23 is fixed on the end of the rotating sleeve 12. These arms are directly opposite and extend to within a short distance of the outer wall of the housing 17 within which they are revolved in unison. As shown in Fig. 7, each arm has an elongated socket slot 24 at its outer end adapted to retain and confine to a limited movement radially with relation to the main shaft, a ball 25 through the center of which the inner end of a wing shaft 26 is free to slide. It is obvious that each ball 25 is free to revolve on the shaft and in the slot, but the latter being in the form of a socket holds by its curved walls, the ball against displacement. Each wing shaft also passes loosely through a ball 27 confined within a socket shoe 28.

The shoe 28 is fitted between the tracks 19 and 22 on each side of the body. This shoe is in the form of a grooved roller having its flanges overhanging the sides of the tracks and revolving around the ball 27.

In Figs. 10, 11, 12 and 13 a wing supporting and rocking mechanism and details relating to the same are shown. As the mechanism of one side of the vehicle is duplicated on the other, a description of one will suffice for both. At the transverse center of the side of the body an opening is provided in which is secured a vertical frame 29. This frame is curved outwardly to its horizontal central portion, but at a different arc to that of the body. On the outerside of the frame and at the center of the ends, bearing boxes 30 and 31 are disposed. The frame is formed with a channel through the bottom of which a central pivot stem 32 passes from the forward box 30. This stem is suitably fastened in position, while ball bearings 33 (Fig. 10) are disposed in the channel to receive the under side of the box 30. By this arrangement the box 30 and parts attached thereto may be swung vertically with the stem as a transverse pivot point. The bearing box 31 is fixed on a curved adjusting shoe 34 adapted to be swung in the arc of a circle having its center in the pivot stem 32. Within the frame 29 a rocker is suspended. This rocker comprises a central block 35 having its normal transverse and longitudinal axes intersecting on the longitudinal axis of the main shaft 11. In other words the normal center of the block 35 is coincident with the center of the circle in which the arm 23 is revolved. Of course when the rocker and block are swung by adjusting the shoe 34, the center of the block becomes eccentric to the circle of revolution. The wing shaft 26 is split into two members which pass through the block 35 and are suitably fastened against movement therein. These members extend some distance from the body and are braced together by webs 36 which adds rigidity and strength to the wing shaft. The wing shaft also comprises jointed parts which will be described.

It is obvious that as the arm 23 is revolved the wing shaft is swung, its inner and outer ends traveling in an orbit determined by the path between the tracks 19 and 22, the block 35 constituting the pivot and supporting point. In order to afford the block a substantially universal swing it is supported by arms 36ª extending from opposite sides and transversely of the block. These arms converge toward each other and are secured at their outer ends about collars 37. These collars bear against similar collars 38 supported in a diamond shaped rocker frame 39. The contacting collars 37 and 38 at each end are connected by short flanged pins 40. These pins extend vertically with relation to the frame 39 and permit the block 35 and wing shaft to swing in a horizontal plane. At each side, the rocker frame 39 is provided with extending boxes 41 which register with the boxes 30 and 31. Flanged shafts 42 connect each pair of boxes and form horizontal pivots on which the rocker frame may swing in a vertical arc.

By referring to Figs. 1 to 6 inclusive it is obvious that a motion similar to that of a bird's wing is imparted to the wing of this vehicle. This motion of course is determined by the contour of the tracks 19 and 22. When the shoe 28 is traveling in the rear half of its path between the tracks, the wing will be pursuing the forward half of its swing. This movement of the shoe is from the lowest point to the highest point of travel in the full arc of a semi-circle during which movement the wing is fully extended and moves from the highest point to the lowest point. When the tip of the wing reaches its lowermost position the shoe 28 will be at its highest point and just about to enter between the angular portions of the tracks. Continuing the wing moves rearward and upward and the shoe forward and downward for a quarter of a revolution until the shoe reaches the forward horizontal center of the swing. During this movement the wing is retracted, that is its planes are drawn inward and together by a mechanism presently to be described. The movement of the shoe and wing during this quarter of a revolution being at an angle of substantially forty-five degrees to the longitudinal axis of the body, the wing will move upward and rearward in a straight line and gradually fold or retract in a straight line which offers but little resistance to the air and the forward movement of the entire vehicle. On the next quarter movement the shoe and wing travel at an angle of forty-five degrees to the longitudinal axis of the body, but toward the vertical central line of the guides instead of away from it as during the preceding quarter, the wing being gradually extended until it reaches its limit at the highest point of travel ready for the next forward swing. I claim that during this last quarter of a revolution of the wing, there is substantially no atmospheric pressure against the planes of the wing as the edges of said planes are presented and can offer but little resistance to a forward and upward movement. On the other hand the wing being gradually extended tends to exert a lifting and sustaining power and a forward drive which, with the lifting and forward impulse of the down swing of the wing, propels the vehicle forward during three-quarters of the revolution or path of travel of the wing. Sufficient experiments and established facts have demonstrated this claim.

In Figs. 15 to 28 inclusive the wing and details of the same are shown. Referring to Figs. 16, 17, 18 and 19 the wing will be found to comprise three sections A, B and C respectively. These sections are joined together similar to the wing of a bird and by means of these joints the wings are extended and retracted or folded and unfolded. On the sections of these wings planes are suitably supported to swing each on a vertical fixed axis passing through the wing shaft and its members hereinafter described. Suitable means hereinafter described are provided for automatically folding and unfolding the wings and swinging the planes in unison. It is to be understood that the wing is essentially a plane but is composed of a plurality of planes, that is, it is a main plane comprising a number of individual planes.

A folded wing lying in a horizontal plane at a central point of a body and unfolding through the tracing of an almost straight path at an angle forward from said central position to an extreme upward position during which passage it is entirely unfolded and then inscribing a full half revolution forward from the extreme upward to an extreme downward position, will have a lifting power during three-quarters of the revolution, and a folding movement during the remaining quarter which offers no resistance to the air, or at least very little resistance. By having a lifting power during three-quarters of the revolution, and practically no upward resistance during the remaining quarter, while the wing is gaining an upward movement to arrive at its central rearmost position, an apparatus of great lifting power is produced.

While the wing is being moved downward and on account of the main wing shaft having connection with the flexible planes near their forward ends and along one side of each, the resistance offered to the undersides of the planes causes those portions extending rearwardly from the shaft to yield upwardly and slightly incline upwardly, whereby the forward ends of the planes are carried downward a little in advance of the rear portions. The angle of inclination will depend upon the degree of speed at which the wing shaft is moved downward and this will depend upon the power of the operating means and the judgment of the operator.

When the wing is at its extreme upward position and begins its downward path, on account of the location of the main wing shaft with relation to the planes, the wing performs a double function, namely it exerts an upward lift, and by the inclination of the planes and the downward pressure of the wing shaft, a purchase is gained which forces forward, the body to which the wing is attached. On account of there being substantially no resisting pressure to the movement of the wing plane from its lowermost to its rearmost central position, it is held by the mechanism described in a plane substantially coincident with the plane of its movement which is at substantially an angle of forty-five degrees. During this last movement the inclination of the individual planes is similar to that of their downward movement but not to as great a degree. This is apparent because the tendency of the body is to fall.

The section B is joined to the section A by a joint as best shown in Figs. 27 and 28. Section B comprises a wing shaft link portion 43 which is a continuation of the two members of the wing shaft and each of which has a rounded tongue 44 at its end adapted to enter a correspondingly shaped socket 45 on the end of each member of the main wing shaft portion of the section A. A vertical pivot pin 46 passes through both tongues and sockets and will be hereinafter more fully described. Between the sections B and C a like joint is formed at the intersection of the link 43 and the wing arm portion 47. In this arm the wing shaft again becomes a single piece, the members being gradually merged together. As best shown in Figs. 14 and 15, the arm 47 is bent down at right angles and again bent to form a rearwardly extending wing tip portion 48 which is bent in a horizontal plane at an obtuse angle to the arm as best shown in Figs. 16 to 19 inclusive. The portion 48 lies in substantially the same horizontal plane as a plurality of transverse and tapered tubular spars 49 pivoted to and hung from the wing shaft, its link and arm. These spars which are suitably spaced have the greater portion of their length to one side of the wing shaft which is the rear side with relation to the forward movement of both the wing and the body.

Details of the spar supporting means are best shown in Figs. 20 to 24 inclusive although these parts are also shown in other figures. Each spar has a longitudinal band 50 spanning over it from end to end and suitably secured thereto. The band is drawn taut and firmly binds on top of a vertical yoke 51 to which it is also fastened. This yoke is fastened at its lower end to the spar and is rounded to firmly receive the upper half of the spar as is shown in Fig. 20. A screw threaded boss 52 is provided on the lower end of the yoke and receives a vertical adjusting screw 53 locked in position by a jam nut 54 binding on the boss. The screw at its upper end has a ball socket receiving a ball 55 which in turn supports a socket bearing 56 formed on the lowermost member of the wing shaft. A similar bearing socket 57 is formed on the top side of the upper member of the wing shaft and receive a similar ball 58 engaging in a socket boss 59 formed on the upper end of the yoke. These parts are in vertical alinement and by adjusting the screw 53 said parts are tied together, but at the same time permit the spar to swing in a horizontal plane on the wing shaft. Each spar is supported in this way.

It is apparent that some means for causing the wings to fold and unfold as well as means for swinging the spars in unison must be provided and this will be presently described. At this point I desire to call attention to the long narrow planes 60 carried by the spars longitudinally thereof. Each spar and the tip portion 48 carries a plane. Each plane consists of a wire frame 61 suitably braced and covered on its underside with a suitable fabric. Each plane frame is fixed to the underside of its spar near its longitudinal outer edge and the longitudinal edges of the planes overlap at all times. The planes while rigidly attached to the spars are flexible. This permits the outer and free ends of the planes to yield and the planes to slightly incline as the wing is forced downward as hereinbefore described.

The means for swinging the spars and folding and unfolding the wing comprises a pitman 62 extending from operating means in the body and hereinafter described. The pitman extends parallel with the main wing shaft along the first section and is bent inward at its outer end toward the shaft and at which point it has pivoted connection with a hinge block 63 secured to the link portion 43 just beyond the first joint. On the opposite side of the shaft as shown in Figs. 16 to 19 inclusive and also in Fig. 28, a hinge block 64 is secured to the first wing section shaft members. A second pitman 65 is pivoted at one end to the block 64 and extends along the link members 43 but is not connected thereto. This pitman 65 is also bent inward toward the wing shaft at its outer end and has pivotal connection with a hinge block 66 fixed on the inner end of the arm 47 near its joint. These pitmen act to fold and unfold the jointed portions of the wing shaft.

Referring to Figs. 16 and 18 it will be seen that by moving the pitman 62 outward, the link portion 43 will be swung inward and forward with relation to the travel of the vehicle as shown in Figs. 6, 17 and 19. This movement being transmitted by the pitman 65 swings the section C or arm 47 inward, but rearward, the folding of the wing being complete. The wing is of course unfolded by moving the pitman 62 inward.

The yokes 51 are placed on all the spars and each one is substantially the same as the others. At the joints between the sections A and B and B and C, the pivot pin 46 at each joint passes from the bearing socket 57 down through both tongues 44 and both sockets 45 to the bearing socket 56 and is suitably fastened in place.

The means for swinging the spars in unison with their respective sections comprises special constructions for each section. The yokes 51 of the section A are each provided with a lateral arm 67 a short distance from their lower ends and on the side opposite to the wing shaft. At their outer ends, the arms 67 are pivotally connected, each to a lug 68 fixed on the side of a connecting rod 69. As shown in Figs. 17, 18 and 24, one of the yokes 51 about midway of the section has a rigid lever arm 70 above the arm 67 extending at an angle toward the inner end of a plunger rod 71 underlying the pitman 62 and having connection at its inner end with the same operating means. A flanged stud 72 extending from the underside of the lever arm 70 is confined to slide in the slot 73 (Fig. 26) of a lever 74 fixed on the rod 69 and curved upward from the same. By this arrangement, when the sections are folded and the pitman 62 moved outward the plunger rod 71 is also moved outward and the planes swung by the spars until they are substantially parallel with the longitudinal center of the body 1, the slot 73 permitting the rod 69 to move toward the main wing shaft.

The yokes 51 of the section B have no lateral arms as shown in Fig. 21, except one as shown in Fig. 23. In this last case the yoke is placed on the opposite side of the link members 43 and has a lateral arm 75 having pivoted connection at its free end with the forward end of a plunger lying below the pitman 65 but having no connection therewith. At its opposite or inner end the plunger 76 has pivoted connection with the hinge block 64.

At its free or forward end the plunger has a lug 77 rigid therewith and extending to one side. This lug has pivotal connection (Fig. 23) with the upper forward end of a link 78, bent outward and downward and having pivoted connection at its lower end with an inwardly and upwardly curved lever 79 fixed on top of a collar 80 embracing a connecting rod 81. One of these collars 80 embraces the rod 81 over each spar of the section B, but only one collar has the lever 79. All of the collars however are each pivoted at one side to a bracket 82 fixed on the underlying spar. It is apparent that this construction will cause the planes of the section B to swing in unison. However it is to be observed that some of the spars of the section B are a greater distance apart than others. As shown in Figs. 17 and 19 the planes of the section B are swung substantially parallel to those of the section A when the wing is folded or retracted to its greatest degree.

The spars of the section C are also supported from the wing shaft by the yokes 51. The yokes of this section have no arms or lever connections. However the spars are connected and swung together by adjustable rods 83. These rods engage, each a stud 84 projecting upward from a collar 85 embracing the spar 49, as shown in Fig. 29. At its opposite end each rod 83 is screw threaded into a block 86 pivoted also on one of the collars. The end of the rod is held on the stud 84 by a washer 87 and superposed nuts 88. To vary the distance between the spars of the section C or in other words to adjust the spars in relation to each other, the ends of the rods 83 are removed, a jam nut 89 on the screw threaded portion of each rod is adjusted to give the proper length, and the rod then screwed into the block until the nut 89 jams against the block.

It will be noted that beginning with the innermost spar of the section C and extending outward toward the tip of the wing, each successive rod is longer than its predecessor. This is necessary to properly space the spars and planes. When the wing is folded, the pitman 65 being connected to the hinge block 66 which is fixed on the arm 47, the latter is swung inward and rearward as shown in Figs. 17 and 19. The rods in connection with the yokes 51 of the section C cause the spars and planes to swing together.

Having described the wing and its details I will now describe the means for operating the pitman 62 and the plunger rod 71 whereby the planes and spars are swung when the wing is folded or unfolded.

Again referring to Figs. 8 and 9 it will be noted that the cam plate 21 has a portion extending inward at substantially an angle of forty-five degrees and on this portion a runway 90 is secured as shown in Fig. 37. This runway has two concentric grooves 91 which are substantially transverse to the normal path of travel of the wing shaft. The runway and grooves have substantially the same contour as the tracks 19 and 22. The runway beginning at the upper vertical center point inclines downwardly and outwardly to a point 92 on the forward horizontal central portion or coincident with the intersection of the angles 20 of the tracks, and from this point inclines downward and inward to the lowest point of the runway. These inclined portions correspond to the angular portions of the tracks 19 and 22. On the main wing shaft 26 a collar 93 is arranged to slide and turn. This collar is provided with laterally projecting fingers extending transversely to the shaft and engaging in the grooves 91 of the runway. A ring 97 is mounted on the shaft with which the collar has turning engagement. The ring is provided with a key 95 (Fig. 31) engaging in a longitudinal keyway 94 formed in the shaft and having sufficient length to permit the ring and collar to slide on the shaft, but holding the ring against rotation at all times.

The ring as shown in Figs. 8 and 30, has three spaced ears 99 which receive the rounded ends of the pitman 62 and plunger rod 71 which are pivoted on a transverse pin 100 passing through the ears. It is obvious that while the fingers 96 are traveling in the semi-circular rear portion of the runway, the collar and ring are held inward on the wing shaft, thereby holding the pitman 62 and plunger rod 71 inward, which as before described holds the wing and its planes unfolded or outstretched. When the fingers enter and pass along the downwardly and outwardly inclined portion of the runway, the collar and ring are gradually forced outward and fold or retract the wing and its planes. And finally when the fingers 96 enter and pass along the downwardly and inwardly inclined portion of the runway, the collar and ring are gradually drawn inward on the wing shaft which unfolds the wing and its planes. As the shaft 26 does not rotate on its longitudinal axis the collar 93 must turn on the shaft to maintain the fingers in the grooves of the runway.

The rocker mechanism and frame 29 hereinbefore described are adjustable for the following reason: For instance should the vehicle be traveling at a certain rate of speed and an adverse current of air or sudden gust of wind strike either wing and tend to divert the vehicle from its course and force the wing either upward or downward, it is apparent that by adjusting the rocker so as to change the angle of projection of the wings the momentum of the body 1 will carry it safely and maintain it on its true course and properly balanced. It is the object of this adjusting means to decline one wing and incline the other, both with reference to the normal planes of the wings. This adjusting must be expeditiously performed.

Now referring to Figs. 10, 11 and 33 and the curved shoe 34, it will be noted that the shoe is provided at each edge on its inner side with flanged members 101 engaging in guide ways 102 of curved rail 103. The length of the shoe 34 is equal to the width of the box 31; while the rail 103 is considerably longer and in the arc of a circle having its center coincident with the center of the stem 32 and is suitably attached and built onto the frame 29. A screw 104 is supported in boxes 105 at each end mounted on the frame 29 and is held against longitudinal movement by collars 106. This screw passes between the shoe 34 and the rail 103 and has a threaded sleeve 107 adapted to move longitudinally on the screw when the latter is rotated. This sleeve is provided with a headed shank 108 engaging between guide bars 109 extending transversely of the shoe 34 between the members 101. This arrangement causes the shoe 34 to be swung when the screw is rotated, the members 101 sliding on the curved rail and the transverse guide bars 109 compensating for the movement of the sleeve tangentially to the arc of movement of the members and shoe.

It will be seen that by adjusting the screw and the box 31, the rocker frame 39 is either tilted upward or downward at an angle to its normal horizontal axis, according to the direction in which the screw is rotated. If the rocker frame is tilted upward the wing will be inclined upward from a horizontal plane and if the rocker frame is tilted downward the wing will be inclined downward from the horizontal plane.

For turning the screw a flexible shaft 110 extends from each screw and passes through the covering of the body 1 at a suitable point. These flexible shafts pass as shown in Fig. 9. Their adjacent ends are attached to bevel gears 111 one positioned over the other and mounted in brackets 112 on a forked arm 113 (Fig. 35). This arm extends upward from one of a pair of trussed standards 116 secured on the floor of the car 5. A steering shaft 115 is mounted to revolve between the upper ends of the standards and on this shaft an adjusting wheel 117 is loosely confined near the rear standard. A bevel gear 114 is fastened on the front side of the hub of the wheel and loosely embraces the shaft 115. This gear 114 is positioned between the gears 111 meshing with one at the top and the other at the bottom.

By this arrangement the flexible shafts are rotated in opposite directions and consequently when the adjusting wheel is revolved by the operator sitting on the seat 118, the screws 104 of the rocker mechanisms are revolved in opposite directions, thus tilting one wing upward and the other downward. The effect of tilting the wings in opposite directions is to cause the upwardly inclined wing to move forward on an incline upward against the adverse pressure of air or wind; while the opposite wing is carried forward on an incline downward against the atmospheric pressure, resulting in the restoring of the body at its equilibrium and a true course. The degree of inclination depends of course upon the manipulation of the adjusting wheel 117, the velocity of the air currents, and the judgment of the operator.

For guiding the vehicle a steering or tail operating mechanism is employed. Referring to Figs. 7, 8 and 32, a tail beam 120 extending longitudinally, centrally and rearward from a point just in rear of the braces 9, will be seen. This tail beam is supported on a transverse and horizontal pivot pin 121 mounted in the rear end of a cylindrical and inwardly flared sleeve 122 whereby the beam may be swung in a vertical plane. The outer or rear end of the sleeve protrudes beyond the body 1, while the beam extends rearward a suitable distance and is gradually tapered outward. Near the sleeve a circular member 123 is fixed on the beam and receives on its forward side a rigging ring 124 of smaller diameter. Suitable rigging 125 extends from this ring to radial ribs 126 having their inner ends intersecting at the beam and secured thereto adjacent the member 123. The ribs are suitably spaced apart to give a fan shape and are covered with a suitable fabric 127 as shown in Fig. 8. For steadying the tail beam and relieving the pivot pin 121 from undue strain, the inner end of the beam is supported in a collar 128 arranged to slide on the beam. This collar has pivoted connection (Fig. 8) with the forward end of a link 129 pivotally mounted at its rear end on a horizontal stud 130 secured on a platform 132 (Figs. 8 and 32) which is supported from the inner side of the body 1. As the beam is swung in a vertical plane or up and down, the collar 128 will slide on the beam, but the tail beam is free to rotate on its longitudinal axis.

The movement of the tail up and down is accomplished by the following mechanism: A ring 133 is fixed on the extreme inner end of the tail beam, and to its upper and lower sides flexible connections 134 are attached. These connections pass up and down and over pulleys 135, 136, and a double pulley 137 (Fig. 32) to the car 5. The connections 134 are wound in opposite directions about a drum 138. This drum is fixed on a shaft 139 mounted in a bracket 140 and extending through the forward standard 116. On the rear end of the shaft 139 a pinion 141 is fixed and meshes in an internal gear 142 fixed on the forward end of the steering shaft 115, on which is also secured a steering wheel 143. By revolving the steering wheel the flexible connections are wound and unwound on the drum and the tail swung up and down whereby the course of the vehicle is directed upward or downward.

For guiding the body in a lateral or circular direction to either side, the following mechanism is provided: The sleeve 122 has an annular bead 144 fitting in a suitable socket formed in the bearing ring 4 whereby the sleeve may be revolved about its longitudinal axis. With reference to Fig. 32 the sleeve 122 is provided with an internal gear rack 145 extending substantially around one-half its inner periphery at the right hand side and at such an angle as to mesh with a bevel gear 146 (Fig. 8) fixed on the end of a counter shaft 147. This shaft is supported in a bearing bracket 148 extending horizontally from the inner wall of the body. On the forward end of the counter shaft a pinion 149 is fixed and meshes with a bevel gear 150 thereunder. This bevel gear 150 is secured on the rear end of an inclined shaft 151 supported in bearing brackets 152. The shaft 151 extends down into the car 5 and carries on its lower end, a pinion 153 under and meshing with a vertical gear 154 fixed on an over head shaft 155 supported from the body by bearing hangers 156. On the forward end of the shaft 155, a cross lever 157 is centrally fastened and has depending from each end, a connection 158. Transversely of the car and substantially central, the engine 159 is fastened to the floor and at each side of this engine, (Fig. 9) a bell crank foot lever 160 is pivoted to the floor at the lower end of its vertical member and has its horizontal member directed forward and attached to one of the connections 158.

The operator sitting on the seat 118 places one foot against each lever 160 and by pressing either lever forward may swing the cross lever 157 by means of the connections 158. The swinging of the cross lever 157 rotates the sleeve 122 by means of shaft 155, gear 154 and pinion 153, shaft 151, gear 150 and pinion 149, and pinion 147 and internal rack 145. The effect of rotating the sleeve 122 is to swing the tail in the arc of a circle at an angle to its horizontal plane or "twist" it. By means of the steering wheel 143 and the foot levers 160 it is possible to raise and lower the tail and twist it to either side. This movement may be carried out independently or simultaneously and the course of the vehicle either directed to right or left, up or down, straight ahead, or in a spiral path. As an example, if the tail is swung downward and twisted to right side of the vehicle with relation to Fig. 8, it would present sufficient resistance to cause the vehicle to pursue a downward course in a curve to the right. If the parts were held in this position the vehicle would descend in a spiral path.

In conclusion I wish to call attention to the similarity of the invention herein described and certain birds. The development of this invention has been carried on only after years of study and observation of certain birds and their manner of flying. For instance observe the long slender wings of the swallow and its small frail body and the ease with which it manipulates its wings. Then notice the quail with short wide wings, but which are moved more rapidly in flying than those of any other bird. The body of the quail is not only larger but heavier than that of other birds whose wings are larger and of greater area. And finally observe the eagle with a comparatively light body and long medium width wings. An eagle can carry a dead weight equal to the weight of its body. I have experimented with these three combinations and have embodied in this invention, wings which are designed to move nearly as rapidly as those of a quail while their size is in proportion to those of an eagle, and the body and operating mechanism being in proportion and comparatively light in weight, a great lifting power is obtained.

What I claim is:

1. In an aerial vehicle, a body, wings pivotally supported by the body and having projections, an operating device having connection with the projections of the wings and supported by the body, and a member supported by the body having a guide-way in which the projection of each wing is received, the guide-way of the member having a portion in the form of an arc of a circle, and another portion contiguous thereto having an angular shape.

2. In a wing adjusting device for aerial vehicles, the combination with a body and a wing and its shaft, of a support pivotally mounted at one of its ends on the body and having pivotal connection with the wing shaft at a point distant from its point of pivotal connection to the body, and an adjusting device having connection with the free end of the support.

3. In a wing adjusting device for aerial vehicles, the combination with a body and a wing and its shaft, of a support pivoted on the body and having its pivot point at one side, a member pivoted in the support, the said member receiving the wing shaft, and an adjusting device having connection with the free end of the support.

4. An aerial vehicle wing comprising, a main shaft, shaft sections hinged together, a connection secured at one end to the main shaft and attached at its outer end to one of the shaft sections, there being an intermediate shaft section between the first named section and the main shaft free from the said connection, and an operating member having connection at its outer end to the intermediate shaft section.

5. An aerial vehicle wing comprising, a main shaft, an intermediate shaft section hinged to the main shaft, an outer shaft section hinged to the intermediate shaft section, a connection attached to the outer section and the main shaft and spanning the intermediate shaft section, a plurality of spars pivotally mounted on the shaft sections and extending laterally therefrom, and connections between some of the spars.

6. An aerial vehicle wing comprising a main shaft, an intermediate shaft section hinged to the main shaft, an outer shaft section hinged to the intermediate shaft section, a connection attached to the outer section and the main shaft and spanning the intermediate shaft section, a plurality of spars pivotally mounted on the shaft sections and extending laterally therefrom, connections between some of the spars, and a plane mounted on each spar.

7. An aerial vehicle wing comprising an inner section, an intermediate section, an outer section, all of the sections being joined together, each section comprising a plurality of plane supports, and members connecting the plane supports of each section in relative position, there being a separate member for each section.

8. In an aerial vehicle, a body, a wing shaft pivoted on the body and projecting into and outward from the body, an intermediate shaft section hinged to the wing shaft, a wing tip shaft section hinged to the outer end of the intermediate shaft section, an actuating connection extending longitudinally of the wing shaft and having pivoted connection with the intermediate shaft section, a connection pivotally engaged at one end with the wing shaft and pivotally engaged at the other end with the tip shaft section, a guiding device in the body engaged by the wing shaft, an actuating member movably mounted on the wing shaft and having connection with the actuating connection, and an operating device mounted in the body having engagement with the actuating member.

9. In an aerial vehicle, the combination with a body provided with movable wings, of a tail plane extending from the body, a projection extending from the tail plane into the body, a member mounted to revolve in the body, the projection extending through the member and being pivoted therein, gears having connection with the member, and flexible connections mounted in the body in opposed relation and having connection with the inner end of the projection.

10. In an aerial vehicle, the combination with a body having movable wings, of a tail shaft extending from the body and having a portion extending into the body, supports radiating from the shaft, a tail plane carried by the supports and the shaft, a conical member mounted to revolve in the body, the tail shaft being pivotally mounted in the smaller end of the member and extending therethrough, gear teeth provided on the member, a gear meshing with the gear teeth, gearing within the body having connection with said gear, and flexible connections mounted in the body in opposed relation and having connection with the inwardly extending end of the tail shaft.

11. In an aerial vehicle, the combination with a body having movable wings and a car depending from the body, of a tail plane swingingly and revolubly mounted on the body, mechanism for revolving the tail plane including gearing connections, a cross lever disposed in the car, foot levers mounted in the car, and connections between the cross lever and the foot levers; mechanism for swinging the tail plane including flexible connections disposed in opposed relation in the body and car and having connection with the tail plane, and a drum mounted in the car having portions of the last named flexible connections wound thereon.

12. In an aerial vehicle wing adjusting device, the combination with a wing having a plurality of laterally related planes, and a wing shaft, of a support receiving the wing shaft at its central portion, and two members pivotally carrying the support, one of said members being confined on a pivot point, and the other member having provision for movement in the arc of a circle having its center in the pivot point of the first member.

13. In a wing adjusting device, the combination with a wing plane and its shaft, of a frame, a support pivotally mounted in the frame and receiving the wing shaft, and two members pivotally supporting the frame, the pivot supports of the frame being at right angles to the pivot support of the support within the frame, one of said members being movable about a fixed pivot point and the other member arranged to swing in the arc of a circle having its center in the fixed pivot point of the first named member.

14. In an aerial vehicle, a body, guides arranged within the body, wing shafts pivoted on the side of the body intermediate their ends and having their inner ends traveling between said guides whereby the outer ends of the wing shaft are caused to swing downward and forward in the arc of a circle, upward and rearward at an angle and upward and forward at an angle.

15. In an aerial vehicle, a body, guides arranged within the body, wings comprising a plurality of planes, wing shafts forming part of the wings and carrying the planes, the shafts being pivoted to the body and having portions extending within the body and portions extending outwardly from the body and the pivot points, the outwardly extending portions of the shafts being jointed whereby the wings may be folded and unfolded, the inner ends of the wing shafts traveling between the guides whereby the outwardly extending portions of the shafts are caused to move forward and downward in the arc of a circle, rearward and upward at an angle, and forward and upward at an angle, and means operating on the jointed portions of the shafts for folding the wings as the said jointed portions move upward and rearward and unfolding the wings as they move upward and forward and holding them unfolded during their movement in the arc of a circle.

16. In an aerial vehicle, a body, wing planes, wing shafts supporting the planes and pivoted at each side of the body, portions of the shafts extending into the body beyond the pivot points, tracks forming semicircular paths merged at each end into diverging angular portions, the shaft portions traveling in the paths between the tracks, and revolving arms connected to the shaft portions adjacent the tracks.

17. In an aerial vehicle, a body, foldable wing planes projecting from each side of the body, wing shafts supporting the planes and pivoted at each side of the body, portions of the wing shafts extending into the body beyond the pivot points, means within the body for swinging the shafts partially in a semicircular path and partially in an angular path, means on the shaft portions for folding and unfolding the wing planes, and means within the body for operating the folding and unfolding means.

18. In an aerial vehicle, a body, foldable wing planes projecting from each side of the body, wing shafts supporting the planes and pivoted at each side of the body, portions of the wing shafts extending into the body beyond the pivot points, means within the body for swinging the shafts partially in a semicircular path and partially in an angular path, means on the shaft portions for folding and unfolding the wing planes, and means within the body for operating the folding and unfolding means comprising a part for causing the wings to fold and unfold while the shafts are traveling in the angular portion of their paths and holding the wings unfolded during the travel of the shafts in the semi-circular portion of their paths.

19. In an aerial vehicle, a body, foldable wing planes projecting from each side of the body, wing shafts supporting the planes and pivoted at each side of the body, portions of the wing shafts extending into the body beyond the pivot points, means within the body for swinging the shafts partially in a semicircular path and partially in an angular path, means on the shaft portions for folding and unfolding the wing planes, and means fixed within the body for operating the folding and unfolding means.

20. In an aerial vehicle, a body, foldable wing planes projecting from each side of the body, wing shafts supporting the planes and pivoted at each side of the body, portions of the wing shafts extending into the body beyond the pivot points, means within the body for swinging the shafts partially in a semicircular path and partially in an angular path, means slidable on the shaft portions for folding and unfolding the wing planes, and means fixed within the body for operating the folding and unfolding means.

21. In an aerial vehicle, the combination of a body, a car suspended from the body, a wing plane pivoted on each side of the body at substantially its transverse center and arranged to fold, a housing mounted in the body and having tracks, other tracks supported in the body contiguous to the tracks of the housing, the wing planes have portions traveling between the tracks, means operating within the housing for causing the wing plane portions to travel between the tracks, means in the body for folding and unfolding the wing planes, means controlled from the car for adjusting the pivot points of the wing planes, a tail plane mounted on the rear end of the body movable upon both a pivot support and a rotatable support, and means within the car for operating the tail plane on its pivot support and also on its rotatable support.

22. In an aerial vehicle, a body, a wing shaft extending from the body, wing sections connected to the wing shaft arranged to fold and unfold, an operating pitman adjacent the wing shaft and having connection with the wing sections, a pivot support receiving the wing shaft and through which the pitman passes said pivot support being arranged for swinging movement and being pivoted at one side of its center.

23. In an aerial vehicle, the combination with a body, wing shafts extending into the body, a pivoted member pivotally supporting each wing shaft and having its pivot point at one side, one of said members being provided at each side of the body, mechanism for swinging said members including a screw for each member, a carrier on each screw, a curved track for each carrier, flexible shafts, one of said shafts being connected to each screw, and a rotatable controlling device having connection with each flexible shaft.

24. In an aerial vehicle wing, jointed shaft sections, members mounted to swing on the shaft sections, a plurality of spars, each spar being connected near one end with one of the members, and connecting devices connected with some of the members, some of said members being connected with one connecting device and others connected with another connecting device.

25. In an aerial vehicle wing, jointed shaft sections, members mounted to swing on the shaft sections, a plurality of spars, each spar being connected near one end with one of the members, connecting devices connected with some of the members, some of said members being connected with one connecting device and others connected with another connecting device, and planes, a plane being secured to each spar and each plane having a flexible portion.

26. A wing tip comprising, a support, a plurality of members pivoted on the support, a plurality of spars, a spar being connected with each member, each spar having the greater portion of its length projecting from one side of its respective member, and a plurality of connections, a connection being disposed between each pair of spars and pivotally attached thereto.

In testimony whereof I have signed my name to this specification in the presence of two subscribing witnesses.

CLEVELAND A. REX.

Witnesses:
E. B. SANDERS,
GLENN L. BROWN.